US009885454B2

(12) United States Patent
Thullier et al.

(10) Patent No.: US 9,885,454 B2
(45) Date of Patent: *Feb. 6, 2018

(54) OPTICAL MODULE OF AN ILLUMINATING AND/OR SIGNALING DEVICE OF A MOTOR VEHICLE

(71) Applicant: Valeo Vision, Bobigny (FR)

(72) Inventors: Christophe Thullier, Montigny le Bretonneux (FR); Vincent Biarne, Sevran (FR); Thomas Cannone, Poissy (FR)

(73) Assignee: VALEO VISION, Bobigny (FR)

( * ) Notice: Subject to any disclaimer, the term of this patent is extended or adjusted under 35 U.S.C. 154(b) by 55 days.

This patent is subject to a terminal disclaimer.

(21) Appl. No.: 14/751,968

(22) Filed: Jun. 26, 2015

(65) Prior Publication Data
US 2015/0292705 A1 Oct. 15, 2015

Related U.S. Application Data

(63) Continuation of application No. 13/811,977, filed as application No. PCT/EP2011/062618 on Jul. 22, 2011, now Pat. No. 9,347,639.

(30) Foreign Application Priority Data

Jul. 26, 2010 (FR) ..................................... 10 56095

(51) Int. Cl.
B60Q 1/26 (2006.01)
F21S 8/10 (2006.01)
(Continued)

(52) U.S. Cl.
CPC ............ *F21S 48/325* (2013.01); *B60Q 1/076* (2013.01); *B60Q 1/122* (2013.01); *B60Q 1/26* (2013.01);
(Continued)

(58) Field of Classification Search
CPC ............... F21S 48/1154; F21S 48/1216; F21S 48/1233; F21S 48/125; F21S 48/1258; F21S 48/1266; F21S 48/13; F21S 48/1305; F21S 48/1323; F21S 48/1388; F21S 48/2206; F21S 48/215; F21S 48/137; F21S 48/1742; F21S 48/321; F21S 48/1757; F21S 48/1104; F21S 48/24; F21S 48/325; F21S 48/328; F21V 29/677; F21V 29/74;
(Continued)

(56) References Cited

U.S. PATENT DOCUMENTS 6,966,675 B2 11/2005 Albou
7,114,837 B2 10/2006 Yagi et al.
(Continued)

FOREIGN PATENT DOCUMENTS

EP 1434002 A1 6/2004
EP 1746340 A2 1/2007
(Continued)

Primary Examiner — Hargobind S Sawhney
(74) Attorney, Agent, or Firm — Oblon, McClelland, Maier & Neustadt, L.L.P.

(57) ABSTRACT

An optical module of a lighting and/or signaling device of a motor vehicle. In one embodiment, the optical module comprises a support that supports an optical lens and a heat exchanger, with the support connecting the optical lens to the heat exchanger.

20 Claims, 3 Drawing Sheets

(51) Int. Cl.
*F21V 29/67* (2015.01)
*F21V 29/83* (2015.01)
*B60Q 1/076* (2006.01)
*B60Q 1/12* (2006.01)
*F21Y 115/10* (2016.01)

(52) U.S. Cl.
CPC ....... *F21S 48/1104* (2013.01); *F21S 48/1109* (2013.01); *F21S 48/1159* (2013.01); *F21S 48/1216* (2013.01); *F21S 48/1258* (2013.01); *F21S 48/137* (2013.01); *F21S 48/1323* (2013.01); *F21S 48/1388* (2013.01); *F21S 48/14* (2013.01); *F21S 48/145* (2013.01); *F21S 48/215* (2013.01); *F21S 48/2212* (2013.01); *F21S 48/234* (2013.01); *F21S 48/24* (2013.01); *F21S 48/321* (2013.01); *F21S 48/328* (2013.01); *F21V 29/67* (2015.01); *F21V 29/83* (2015.01); *F21S 48/1742* (2013.01); *F21Y 2115/10* (2016.08)

(58) Field of Classification Search
CPC ........ F21V 29/67; F21V 29/02; F21V 19/001; F21V 21/00; B60Q 1/0041; B60Q 1/0047; B60Q 1/045; B60Q 1/00; B60Q 1/04; B60Q 1/26; F21Y 2103/10
USPC ............ 362/145–148, 217.1, 217.11–217.17, 362/249.01, 249.02, 260, 365, 368, 404, 362/632–634
See application file for complete search history.

(56) References Cited

U.S. PATENT DOCUMENTS

| | | | |
|---|---|---|---|
| 7,144,145 B2 | 12/2006 | Watanabe et al. | |
| 7,201,506 B2 | 4/2007 | Ishida et al. | |
| 7,244,057 B2 | 7/2007 | Watanabe et al. | |
| 7,481,561 B2 | 1/2009 | Okuda | |
| 7,665,872 B2 * | 2/2010 | Nakabayashi | F21S 48/1104 362/519 |
| 7,690,818 B2 | 4/2010 | Takada et al. | |
| 7,722,233 B2 | 5/2010 | Meyrenaud | |
| 7,784,955 B2 | 8/2010 | Choi et al. | |
| 7,963,684 B2 | 6/2011 | Staub et al. | |
| 7,985,013 B2 * | 7/2011 | Yasuda | F21S 48/1159 362/294 |
| 8,246,227 B2 * | 8/2012 | Okubo | F21S 48/1159 362/281 |
| 8,256,944 B2 | 9/2012 | Yasuda | |
| 8,287,167 B2 | 10/2012 | Inaba | |
| 8,414,171 B2 | 4/2013 | Kawamura | |
| 8,465,189 B2 | 6/2013 | Inoue et al. | |
| 8,500,315 B2 | 8/2013 | Tokida et al. | |
| 8,591,081 B2 | 11/2013 | Inaba | |
| 2004/0130907 A1 | 7/2004 | Albou | |
| 2004/0202007 A1 | 10/2004 | Yagi et al. | |
| 2005/0094414 A1 | 5/2005 | Ishida et al. | |
| 2005/0122735 A1 | 6/2005 | Watanabe et al. | |
| 2005/0122736 A1 | 6/2005 | Watanabe et al. | |
| 2007/0019430 A1 | 1/2007 | Meyrenaud | |
| 2007/0091632 A1 | 4/2007 | Glovatsky et al. | |
| 2008/0025036 A1 | 1/2008 | Takada et al. | |
| 2008/0144329 A1 | 6/2008 | Okuda | |
| 2009/0034279 A1 * | 2/2009 | Blandin | B60Q 1/076 362/512 |
| 2009/0097269 A1 | 4/2009 | Stauss et al. | |
| 2009/0154190 A1 | 6/2009 | Choi et al. | |
| 2009/0303742 A1 | 12/2009 | Yasuda | |
| 2010/0073950 A1 | 3/2010 | Kawamura | |
| 2010/0128463 A1 * | 5/2010 | Kim | F21S 48/1159 362/84 |
| 2010/0135037 A1 | 6/2010 | Tsukamoto | |
| 2010/0244649 A1 | 9/2010 | Inaba | |
| 2010/0253223 A1 | 10/2010 | Inoue et al. | |
| 2011/0002133 A1 * | 1/2011 | Albou | B60Q 1/076 362/465 |
| 2015/0260366 A1 * | 9/2015 | Youn | F21S 48/1784 362/512 |
| 2015/0369438 A1 * | 12/2015 | Thullier | F21S 48/1216 362/517 |

FOREIGN PATENT DOCUMENTS

| | | |
|---|---|---|
| EP | 1884708 A1 | 2/2008 |
| EP | 1935715 A1 | 6/2008 |
| EP | 2020336 A1 | 2/2009 |
| EP | 2236914 A1 | 10/2010 |
| FR | 2853717 A1 | 10/2004 |
| FR | 2861833 A1 | 5/2005 |
| FR | 2863343 A1 | 6/2005 |
| FR | 2934667 A1 | 2/2010 |
| WO | 2005116520 A1 | 12/2005 |

* cited by examiner

OPTICAL MODULE OF AN ILLUMINATING AND/OR SIGNALING DEVICE OF A MOTOR VEHICLE

CROSS-REFERENCE TO RELATED APPLICATIONS

This application is a continuation of U.S. application Ser. No. 13/811,977 filed Jan. 24, 2013, which is the U.S. National Phase application of PCT/EP2011/062618 filed Jul. 22, 2011, which claims priority to French Application No. 1056095 filed Jul. 26, 2010, which applications are incorporated herein by reference and made a part hereof.

BACKGROUND OF THE INVENTION

1. Field of the Invention

The present invention relates to an optical module of a lighting and/or signaling device of a motor vehicle.

2. Description of the Related Art

It is known practice, for example from documents U.S. Patent Publication No. 2009/0303742, which issued as U.S. Pat. No. 8,256,944, and WO 2005/116 520, to produce lighting devices in which the light source is mounted on a radiator onto which an air stream is directed, so that a portion of the heat produced by the light source is dissipated by the radiator into the air stream. This is particularly the case when the light source is of the light-emitting diode type. This makes it possible to obtain powerful lighting devices. However, such devices have drawbacks. They have complex structures and are therefore complicated to assemble. Moreover, it is necessary to put in place tolerances on many parts that have to be assembled together. The chains of dimensions of the various parts are therefore equally complex in these devices.

SUMMARY OF THE INVENTION

The object of the invention is to provide an optical module of a lighting and/or signaling device that remedies the aforementioned drawbacks and that improves the known optical modules of the prior art. In particular, the invention proposes an optical module of simple structure and in which the chains of dimensions are equally simple.

According to one embodiment of the invention, the optical module of a lighting and/or signaling device of a motor vehicle comprises a support, an optical lens and a heat exchanger. The optical lens and the heat exchanger are attached to the support and the support connects the optical lens to the heat exchanger. Preferably, the support directly supports the lens and directly supports the heat exchanger. Thus, it is possible to produce an optical module that is simple and easy to assemble, the chains of dimensions of the various components also being simple.

The support can be designed to be mounted directly or indirectly on the casing of the lighting and/or signaling device and on the inside of this casing.

The support can also support a fan and/or at least one light reflector and/or a folder and/or a means for channeling air. Preferably, the support directly supports the fan and/or the at least one light reflector and/or the bending element and/or the means for channeling air. Thus, the optical module is further simplified and its assembly is made easier.

The support may comprise means for positioning the optical lens and/or the fan and/or the at least one light reflector and/or the folder and/or the heat exchanger, these means interacting with positioning means provided on the optical lens and/or on the fan and/or on the at least one light reflector and/or on the folder and/or on the heat exchanger.

The optical module may comprise a first and a second light sources designed to perform two distinct functions of lighting and/or of signaling. The first and the second sources may together be designed to perform a lighting function of the high beam type and the second source may be designed to perform alone a lighting function of the low beam type.

The optical module may comprise a light source designed to perform a fog light function.

The support may be capable of being rotatably mounted in a casing of a lighting and/or signaling device of a motor vehicle. Thus, it is possible to orient the axis of the optical module according to the curves negotiated by the vehicle.

The optical module may comprise a base designed to be attached to the casing of the lighting and/or signaling device of the motor vehicle and comprising first articulation means designed to be secured to the support so as to allow the support to rotate relative to the casing.

For example, the support may comprise a tenon designed to interact with an orifice of the base, for example one tenon at the top of the support and one underneath, the axis passing through these tenons corresponding to the rotation axis of the module relative to the casing.

The base may comprise a maneuvering mechanism designed to orient the support relative to the casing. According to one embodiment, the base may comprise a driving mechanism from which a drive shaft emerges interacting with an orifice of the module, preferably of the support, so as to rotate the support. As a variant, and as illustrated, the support may be indirectly connected to the base via an intermediate part, for example a frame. The support may then comprise fastening lugs attached to the frame. The frame in this case comprises the means interacting with the first articulation means of the base, for example a tenon at the top and an orifice at the bottom, the tenon turning in the top orifice of the base and the orifice receiving the drive shaft.

The optical lens may be positioned on and attached to the support in the front portion of the latter and the heat exchanger may be positioned on and attached to the support beneath the latter.

The optical module may comprise a first and a second light source which are positioned on and attached to the heat exchanger.

The optical module may comprise a first reflector positioned relative to the support and attached to the support, beneath the support, between the support and the heat exchanger.

The optical module may comprise a second reflector positioned relative to the support and attached to the support, beneath the support and the heat exchanger.

The optical module may comprise a folder positioned on and attached to the support.

The optical module may comprise a fan positioned on and attached to the support, for example above the support and/or behind the latter.

The lighting and/or signaling device may comprise a casing in which the support is mounted.

In one aspect, one embodiment comprises an optical module of a lighting and/or signaling device of a motor vehicle comprising a support, an optical lens, and a heat exchanger wherein the optical lens and the heat exchanger are attached to the support and the support connects the optical lens to the heat exchanger This invention, including all embodiments shown and described herein, could be used alone or together and/or in combination with one or more of the features covered by one or more of the following list of features:

- The optical module wherein a first light source is designed to perform a lighting function of a high beam type in interaction with a second light source and in that the second light source is designed to perform alone one lighting function of a low beam type.
- The optical module wherein the support is rotatably mounted in a casing of the lighting and/or signaling device.
- The optical module wherein the optical module further comprises a first reflector and a second reflector, the second reflector having an airstream guide that is secured to or formed with the second reflector.
- The optical module wherein a reflective surface of a first reflector has a first portion and a second portion in the form of an ellipsoid with a first light-emitting diode and a second light-emitting diode at a focal point of each ellipsoid.
- The optical module wherein the support comprises means for positioning the optical lens and a fan and at least one light reflector and a folder and a heat exchanger, these means interacting with positioning means provided on the optical lens and on the fan and on the at least one light reflector and on the folder and on the heat exchanger.
- The optical module wherein the support is attached to a base that forms a frame in which the support is articulated.
- The optical module wherein the support directly supports the optical lens and the heat exchanger.
- The optical module wherein the support is rotatably mounted in a casing of the lighting and/or signaling device.
- The optical module wherein the optical module further comprises a first reflector and a second reflector, the second reflector having an airstream guide that is secured to or formed with the second reflector.
- The optical module wherein the optical module further comprises a first reflector and a second reflector, the second reflector having an airstream guide that is secured to or formed with the second reflector.
- The optical module wherein a reflective surface of a first reflector has a first portion and a second portion in the form of an ellipsoid with a first light-emitting diode and a second light-emitting diode at a focal point of each ellipsoid.
- The optical module wherein a reflective surface of a first reflector has a first portion and a second portion in the form of an ellipsoid with a first light-emitting diode and a second light-emitting diode at a focal point of each ellipsoid.
- The optical module wherein a reflective surface of a first reflector has a first portion and a second portion in the form of an ellipsoid with a first light-emitting diode and a second light-emitting diode at a focal point of each ellipsoid.
- The optical module wherein the support comprises means for positioning the optical lens and a fan and at least one light reflector and a folder and a heat exchanger, these means interacting with positioning means provided on the optical lens and on the fan and on the at least one light reflector and on the folder and on the heat exchanger.
- The optical module wherein the support comprises means for positioning the optical lens and a fan and at least one light reflector and a folder and a heat exchanger, these means interacting with positioning means provided on the optical lens and on the fan and on the at least one light reflector and on the folder and on the heat exchanger.
- The optical module wherein the support is attached to a base that forms a frame in which the support is articulated.
- The optical module wherein the support is attached to a base that forms a frame in which the support is articulated.
- The optical module wherein the support directly supports the optical lens and the heat exchanger.
- The optical module wherein the support directly supports the optical lens and the heat exchanger.

These and other objects and advantages of the invention will be apparent from the following description, the accompanying drawings and the appended claims.

The invention also relates to a motor vehicle comprising a lighting and/or signaling device as defined above.

The appended drawing represents, as examples, two embodiments of an optical module of a motor vehicle according to the invention.

BRIEF DESCRIPTION OF THE ACCOMPANYING DRAWINGS

DETAILED DESCRIPTION OF THE PREFERRED EMBODIMENTS

Figure 1:
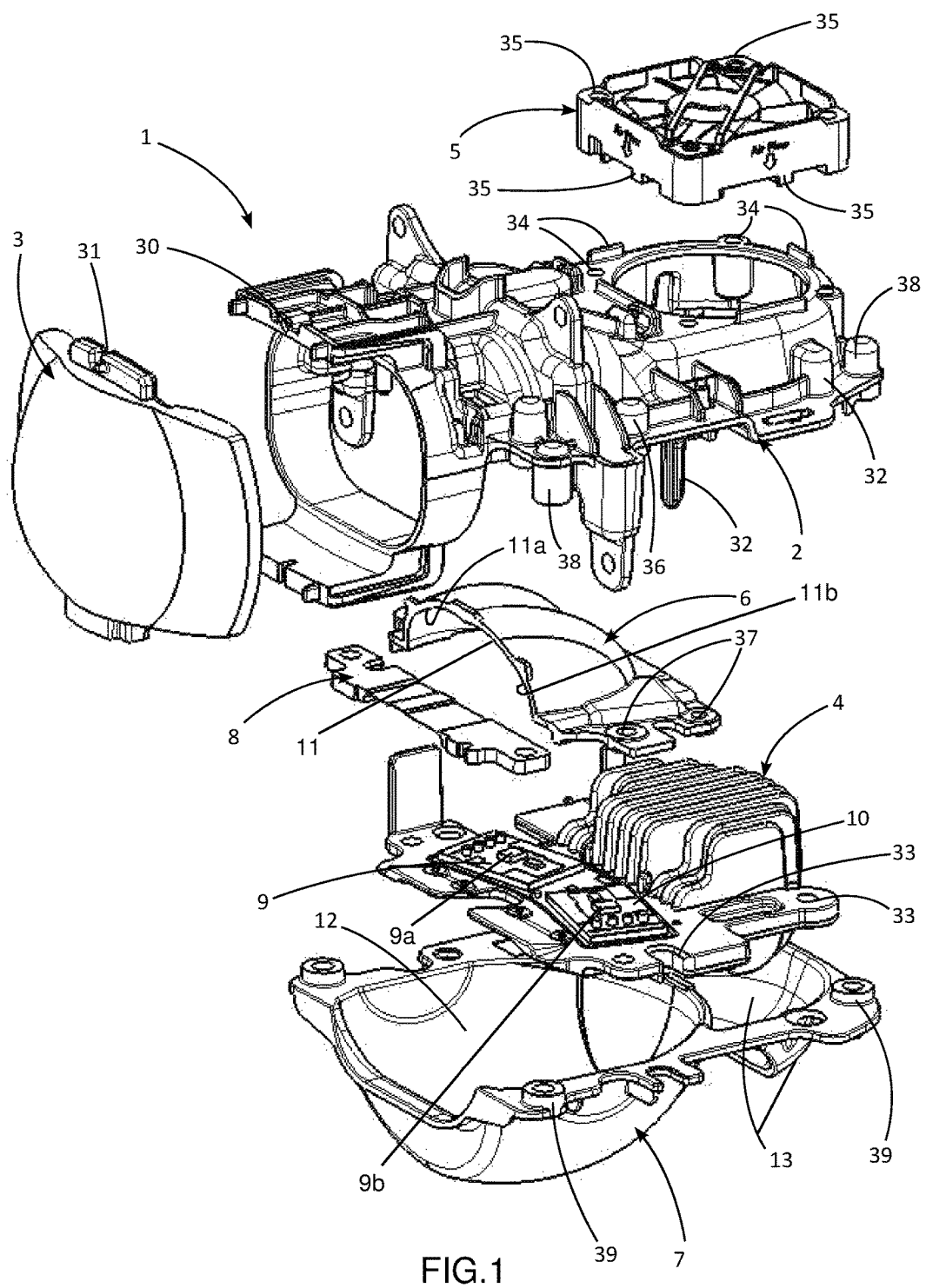
FIG. 1 is an exploded view of a first embodiment of an optical module according to one embodiment of the invention.

A first embodiment of an optical module 1 of a lighting and/or signaling device is described below with reference to FIGS. 1 to 3. In this example, the optical module of a lighting and/or signaling device is an optical module 1 with two functions:

function of lighting of the low beam type, and
function of lighting of the high beam type.

The optical module 1 comprises mainly a support 2, an optical lens 3, a fan 5, a heat exchanger, such as a radiator 4, a first reflector 6, a second reflector 7 and a folder 8.

The support 2 comprises means 30 for positioning the optical lens 3 on and attaching it to the support 2. These means 30 interact with means 31 of positioning and of attachment provided on the optical lens 3. The optical lens 3 is thus supported by the support 2. Preferably, the optical lens 3 is directly supported by the support 2.

The support 2 comprises means 32 for positioning the radiator 4 on and attaching it to the support 2. These means 32 interact with positioning and attachment means 33 provided on the radiator 4. The radiator 4 is thus supported by the support 2. Preferably, the radiator 4 is directly supported by the support 2.

The support 2 comprises means 34 for positioning the fan 5 on and attaching it to the support 2. These means 34 interact with positioning and attachment means 35 provided on the fan 5. The fan 5 is thus supported by the support 2. Preferably, the fan 5 is directly supported by the support 2.

The support 2 comprises means 36 for positioning the first reflector 6 on and attaching it to the support 2. These means 37 interact with positioning and attachment means provided on the first reflector 6. Alternatively, the support 2 may only have means for attaching the first reflector 6 to the support 2. Positioning means may be provided on the first reflector 6 in order to interact with means of positioning on the radiator 4 or on a first light source, so as to position the first reflector 6 relative to the first light source. The first reflector 6 is thus supported by the support 2. Preferably, the first reflector 6 is directly supported by the support 2. Again alternatively, the first reflector 6 may be positioned on the radiator 4 and supported by the radiator 4.

The support 2 comprises means 38 for positioning the second reflector 7 on and attaching it to the support 2. These means 38 interact with positioning and attachment means 39 provided on the second reflector 7. Alternatively, the support 2 may only have means for attaching the second reflector 7 to the support 2. Positioning means may be provided on the second reflector 7 in order to interact with positioning means on the radiator 4 or on a second light source, so as to position the second reflector 7 relative to the second light source. The second reflector 7 is thus supported by the support 2. Preferably, the second reflector 7 is directly supported by the support 2. Again alternatively, the second reflector 7 may be positioned on the radiator 4 and supported by the radiator 4.

The support 2 comprises means for positioning the folder 8 on and attaching it to the support 2. These means interact with positioning and attachment means provided on the folder 8. Alternatively, the support 2 may only have means for attaching the folder 8 to the support 2. Positioning means may be provided on the folder 8 in order to interact with positioning means on the radiator 4 or on the first light source, so as to position the folder 8 relative to the first light source. The folder 8 is thus supported by the support 2. Preferably, the folder 8 is directly supported by the support 2. Again alternatively, the folder 8 may be positioned on the radiator 4 and supported by the radiator 4.

The support 2 comprises means 38 for positioning an air-stream guide 13 on and attaching it to the support 2. These means 38 interact with positioning and attachment means 39 provided on the air-stream guide 13. Alternatively, the air-stream guide 13 may be secured to the second reflector 7, as in FIGS. 1 to 5. The air-stream guide 13 is thus supported by the support 2. Preferably, the air-stream guide 13 is directly supported by the support 2.

Preferably, the first light source comprises a first light-emitting diode 9a mounted on a first printed circuit 9 and a second light-emitting diode 10a mounted on a second printed circuit 10. These first and second printed circuits 9 and 10 are preferably positioned on and attached to the radiator 4. The light beams emitted by the first source are reflected by a reflective surface 11 of the first reflector 6 before being partially reflected by the folder 8 and diverted by the optical lens 3. These various elements form a first optical system making it possible to generate a light beam with cut-off of the low beam type. Preferably, the reflective surface 11 has a first portion 11a in the form of an ellipsoid and a second portion 11b in the form of an ellipsoid, the first diode 9a being at least substantially at the first focal point of the first ellipsoidal portion 11a, the second diode 10a being at least substantially at the first focal point of the second ellipsoidal portion 11b and the folder 8 being at least substantially at the second focal points of the first and second ellipsoidal portions 11a, 11b. The folder 8 is preferably also at the focal point of the optical lens 3.

Figure 2:
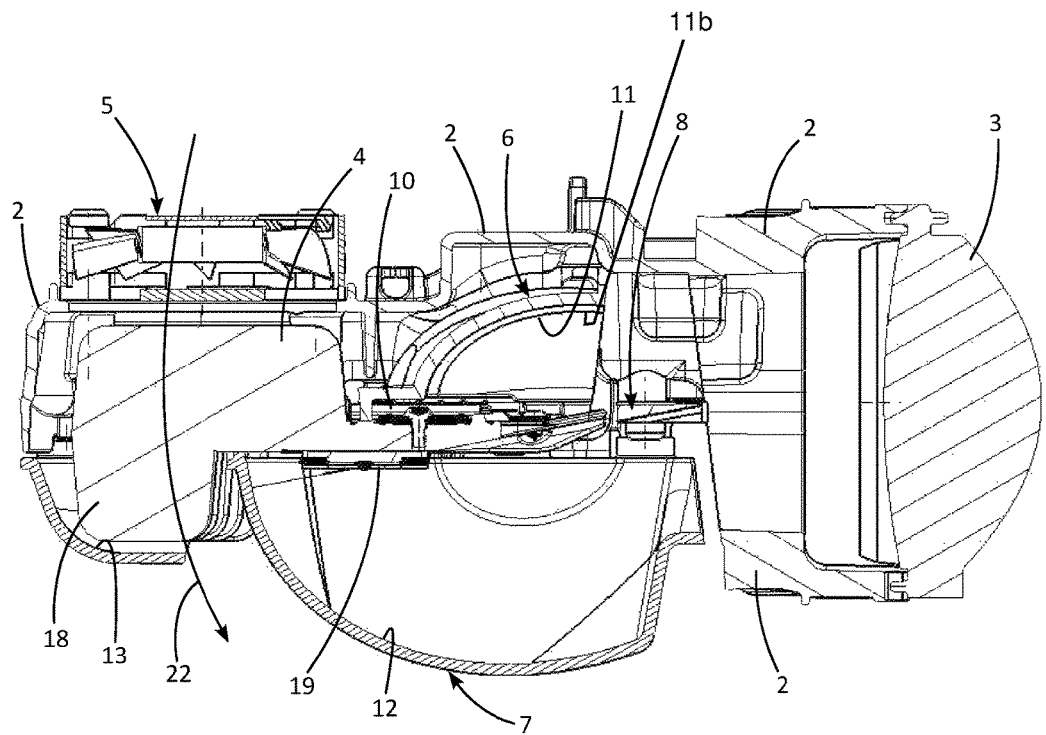
FIG. 2 is a longitudinal section of the first embodiment of the optical module according to one embodiment of the invention.
Figure 3:
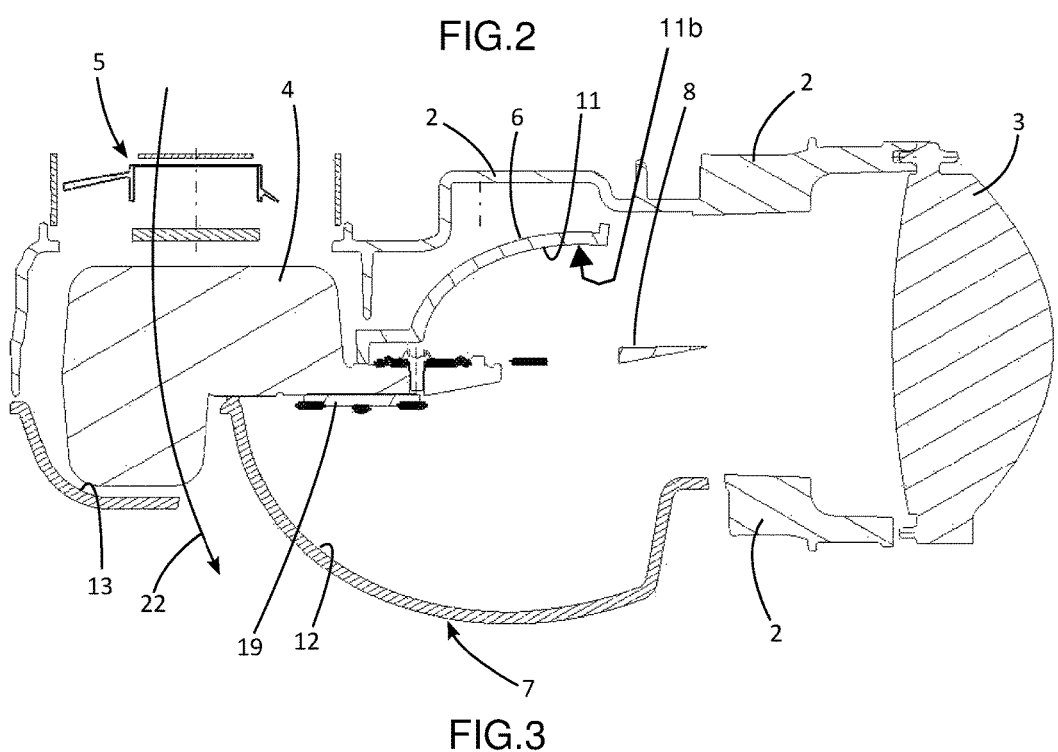
FIG. 3 is a longitudinal section of the first embodiment of the optical module according to one embodiment of the invention.

Preferably, the second light source comprises a third light-emitting diode mounted on a third printed circuit 19 (FIGS. 2 and 3). This printed circuit 19 is preferably positioned on and attached to the radiator 4. The light beams emitted by the second source are reflected by a reflective surface 12 of the second reflector 7 before being diverted by the optical lens 3. These various elements form a second optical system making it possible to generate a complementary portion of the light beam generated by the first optical system so that the first and second beams produce complementarily a light beam of the high beam type. Preferably, the reflective surface 12 is in the form of an ellipsoid. The third diode is at least substantially at the first focal point of the reflective surface 12 and the focal point of the optical lens 3 is at least substantially at the second focal point of the reflective surface 12.

Because of the structure of the optical systems described above, it is understood that it is important for the various components of the optical systems, namely light sources, reflectors 6, 7, folder 8 and optical lens 3, to be positioned precisely relative to one another. In order to do this, there are several solutions. Notably, it is possible to position the lens 3 relative to the support 2, position the reflectors 6, 7 relative to the support 2, position the light sources relative to the radiator 4 and position the radiator 4 relative to the support 2. In this example, the chain of dimensions positioning the light sources relative to the reflectors 6, 7 or relative to the optical lens 3 passes through the radiator 4 and the support 2. Alternatively, it is possible to position the lens 3 relative to the support 2, position the reflectors 6, 7 relative to the radiator 4, position the light sources relative to the radiator 4 and position the radiator 4 relative to the support 2. In the latter example, the chain of dimensions positioning the light sources relative to the reflectors 6, 7 now passes only through the radiator 4.

Advantageously, in all the variants, the various components of the optical systems are supported by the support indirectly or preferably directly.

The fan 5 makes it possible to create an air stream 22 flowing between the fins 18 of the radiator 4 and channeled by a guide 13 in order to optimize the heat exchange between the air and the radiator 4.

Preferably, the various printed circuits supporting the light-emitting diodes are attached to the radiator 4 and positioned relative to the radiator 4. They are therefore indirectly supported by the support 2, the radiator 4 being attached to the support 2.

The support 2 furthermore has attachment means allowing it to be attached to a structure of the motor vehicle. Preferably, the attachment means allow it to be attached in a casing of a lighting and/or signaling device, this casing furthermore having means for attachment to the structure of the motor vehicle. The support 2 is preferably produced by molding. It is, for example, made of metal or of plastic, notably of composite.

Figure 4:
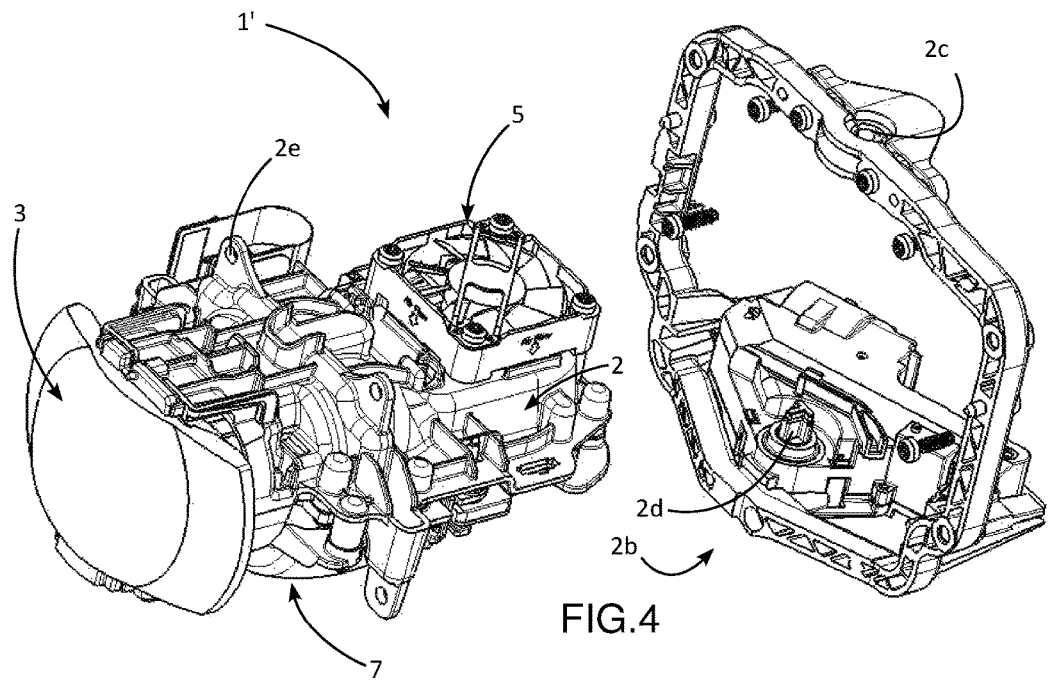
FIG. 4 is an exploded view of a second embodiment of the optical module according to another embodiment of the invention.
Figure 5:
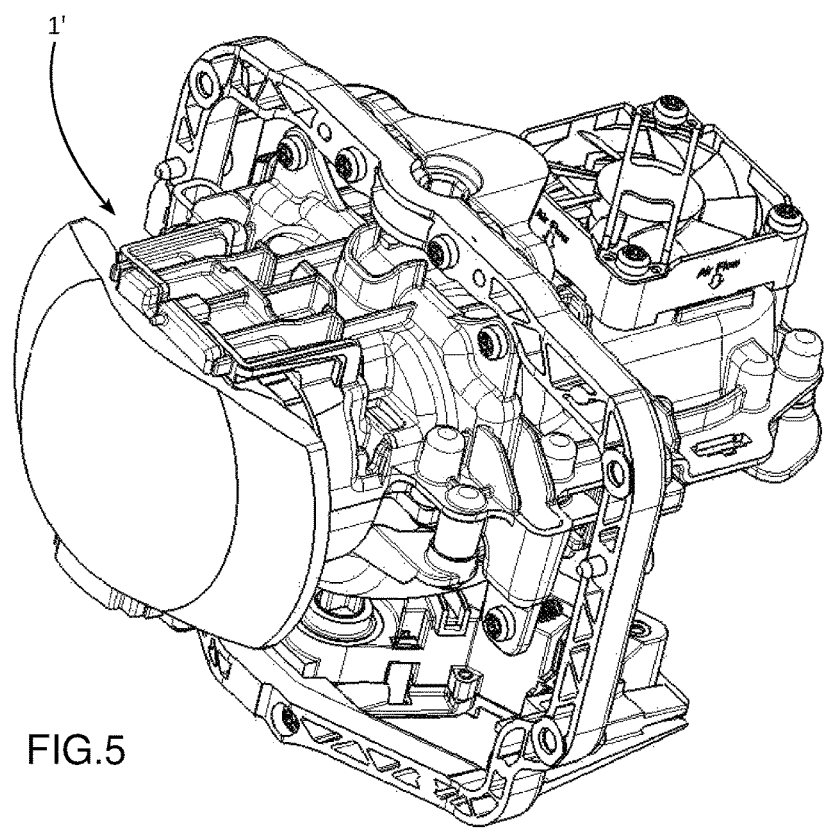
FIG. 5 is a view in perspective of the second embodiment of the optical module according to another embodiment of the invention.

A second embodiment of the optical module 1 according to the invention is described below with reference to FIGS. 4 and 5. It differs from the first embodiment only in the structure of the support 2. Specifically, in this second embodiment, the support 2 comprises first articulation means 2c which interact with second articulation means on a base 2b designed to be attached in a casing of the lighting and/or signaling device. Thus, the support 2 and hence the optical module 1 can be oriented relative to the casing. The base 2b forms, for example, a frame in which the support 2 is articulated. This articulation is, for example, achieved along a vertical axis, for example by a pivot link. Thus, a function of modification of the direction of the optical axis of the lighting and/or signaling device can be achieved when the motor vehicle negotiates a curve. The base 2b may also comprise a maneuvering means such as a gear motor making it possible to control the orientation of the support 2 and hence that of the optical module 1.

For example, the support 2 may comprise, as first articulation means, a tenon (not shown), for example one tenon at the top of the support 2 and one tenon beneath, the axis passing through these tenons corresponding to the rotation axis of the module 2 relative to the casing. The base 2b may comprise, as second articulation means, orifices designed to interact with the tenons.

According to one variant, the base 2b comprises a drive mechanism, from which there emerges a drive shaft 2d interacting with an orifice of the module 1, preferably of the support 2, so as to rotate the support 2. As a variant, and as illustrated, the support 2 may be indirectly connected to the base 2b by an intermediate part (not shown for reasons of clarity), for example a frame. The support may then comprise fastening lugs 2e attached to the frame. The frame then comprises means interacting with the second articulation means of the base 2b, for example a tenon at the top and an orifice at the bottom, the tenon turning in the top orifice 2c of the base 2b and the orifice receiving the drive shaft 2d.

Throughout this document, "supporting a component" means the action of absorbing the forces exerted on the component and of transmitting them to the structure of the motor vehicle, the forces being notably those, at a distance, due to forces of acceleration such as weight. Moreover, a part "directly" supporting a component directly absorbs the forces exerted on the component and transmits them to the structure of the motor vehicle, that is to say that there is no intermediate part transmitting the forces between the component and the part. Alternatively, an intermediate part may be provided if its sole function is an interface function. In the latter case, despite the intermediate part, it is considered that the part directly supports the component.

In the various embodiments, the optical module 1 performs a first, low-beam function and a second, high-beam function. However, the optical module 1 according to the invention may perform any other function as a replacement of one and/or the other of the first and second functions. The optical module according to the invention may also perform only one function of lighting and/or signaling, such as a fog lamp function.

Throughout this text, the term "at least substantially" used with various adjectives means: "adjective" or "substantially adjective", for example "at least substantially perpendicular" means "perpendicular" or "substantially perpendicular".

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical module for a motor vehicle, said optical module comprising:
    a support;
    an optical lens; and
    a heat exchanger wherein said optical lens and said heat exchanger are attached to said support and said support connects said optical lens to said heat exchanger;
    wherein said optical module is received in at least one of a lighting device or a signaling device of the motor vehicle;
    wherein said optical lens defines a common lens, said optical module further comprises a first reflector and a second reflector that are coupled to a common support and having at least a first light source and a second light source and said optical lens such that rays emitted by said first light source are reflected by one of said first or second reflectors towards said common lens for being deviated to form a first beam and rays emitted by said second light source being reflected by the other of said first or second reflectors towards said common lens for being deviated to form a second beam.

2. The optical module according to claim 1, wherein said first light source performs a lighting function of a high beam type in interaction with said second light source and in that said second light source performs alone one lighting function of a low beam type.

3. The optical module according to claim 2, wherein said support is rotatably mounted in a casing of at least one of said lighting device or said signaling device.

4. The optical module according to claim 2, wherein a reflective surface of said first reflector has a first portion and a second portion in the form of an ellipsoid with a first light-emitting diode at a focal point of said ellipsoid of said first portion and a second light-emitting diode at a focal point of said ellipsoid of said second portion, wherein said first and second portions are adjacent each other.

5. The optical module according to claim 2, wherein said support comprises positioning means for positioning said optical lens, a fan, at least one of said first or second reflectors, a folder or said heat exchanger, these means interacting with positioning means provided on at least one of said optical lens, said fan, said at least one of said first or second reflectors, said folder, or said heat exchanger.

6. The optical module according to claim 2, wherein said support is attached to a base that forms a frame in which said support is articulated.

7. The optical module according to claim 2, wherein said support directly supports said optical lens and said heat exchanger.

8. The optical module according to claim 1, wherein said support is rotatably mounted in a casing of at least one of said lighting device or said signaling device.

9. The optical module according to claim 8, wherein a reflective surface of said first reflector has a first portion and a second portion in the form of an ellipsoid with a first light-emitting diode at a focal point of said ellipsoid of said first portion and a second light-emitting diode at a focal point of said ellipsoid of said second portion, wherein said first and second portions are adjacent each other.

10. The optical module according to claim 8, wherein said support comprises positioning means for positioning said optical lens, a fan, at least one of said first or second reflectors, a folder or said heat exchanger, these means interacting with positioning means provided on at least one of said optical lens, said fan, said at least one of said first or second reflectors, said folder, or said heat exchanger.

11. The optical module according to claim 8, wherein said support is attached to a base that forms a frame in which said support is articulated.

12. The optical module according to claim 8, wherein said support directly supports said optical lens and said heat exchanger.

13. The optical module according to claim 1, wherein a reflective surface of a first reflector has a first portion and a second portion in the form of an ellipsoid with a first light-emitting diode at a focal point of said ellipsoid of said first portion and a second light-emitting diode at a focal point of said ellipsoid of said second portion, wherein said first and second portions are adjacent each other.

14. The optical module according to claim 1, wherein said support comprises positioning means for positioning said optical lens, a fan, at least one of said first or second reflectors, a folder or said heat exchanger, these means interacting with positioning means provided on at least one of said optical lens, said fan, said at least one of said first or second reflectors, said folder, or said heat exchanger.

15. The optical module according to claim 1, wherein said support is attached to a base that forms a frame in which said support is articulated.

16. The optical module according to claim 1, wherein said support directly supports said optical lens and said heat exchanger.

17. An optical module for a motor vehicle, said optical module comprising:
   a support;
   an optical lens; and
   a heat exchanger wherein said optical lens and said heat exchanger are attached to said support and said support connects said optical lens to said heat exchanger;
   wherein said optical module further comprises a first reflector and a second reflector, said second reflector having an airstream guide that is secured to or formed with said second reflector.

18. The optical module according to claim 17, wherein a reflective surface of said first reflector has a first portion and a second portion in the form of an ellipsoid with a first light-emitting diode at a focal point of said ellipsoid of said first portion and a second light-emitting diode at a focal point of said ellipsoid of said second portion, wherein said first and second portions are adjacent each other.

19. An optical module for a motor vehicle, said optical module comprising:
   a support;
   an optical lens; and
   a heat exchanger wherein said optical lens and said heat exchanger are attached to said support and said support connects said optical lens to said heat exchanger;
   wherein said optical module further comprises a first reflector and a second reflector, said second reflector having an airstream guide that is secured to or formed with said second reflector; wherein said first light source performs a lighting function of a high beam type in interaction with said second light source and in that said second light source performs alone one lighting function of a low beam type.

20. An optical module for a motor vehicle, said optical module comprising:
   a support;
   an optical lens; and
   a heat exchanger wherein said optical lens and said heat exchanger are attached to said support and said support connects said optical lens to said heat exchanger;
   wherein said support is rotatably mounted in a casing of at least one of q lighting device or q signaling device;
   wherein said optical module further comprises a first reflector and a second reflector, said second reflector having an airstream guide that is secured to or formed with said second reflector.

* * * * *